United States Patent
Goenka

(10) Patent No.: US 11,811,504 B2
(45) Date of Patent: Nov. 7, 2023

(54) RPD UCD REFRESH FOR TIMESTAMP RECOVERY

(71) Applicant: ARRIS Enterprises LLC, Suwanee, GA (US)

(72) Inventor: Anand Kumar Goenka, Bengaluru (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/847,803

(22) Filed: Jun. 23, 2022

(65) Prior Publication Data
US 2022/0416926 A1 Dec. 29, 2022

Related U.S. Application Data

(60) Provisional application No. 63/214,090, filed on Jun. 23, 2021.

(51) Int. Cl.
*H04J 3/06* (2006.01)
*H04L 7/00* (2006.01)

(52) U.S. Cl.
CPC .......... *H04J 3/0667* (2013.01); *H04J 3/0682* (2013.01); *H04L 7/0087* (2013.01)

(58) Field of Classification Search
CPC ...... H04J 3/0644; H04J 3/0661; H04J 3/0667; H04J 3/0673; H04J 3/0682; H04L 7/0087; H04L 12/2801
See application file for complete search history.

(56) References Cited

U.S. PATENT DOCUMENTS

| | | | | |
|---|---|---|---|---|
| 10,020,962 | B2 * | 7/2018 | Patrick | H04L 12/4633 |
| 10,044,607 | B2 * | 8/2018 | Chapman | H04L 45/50 |
| 10,050,801 | B2 * | 8/2018 | Salinger | H04L 27/0008 |
| 10,616,000 | B2 * | 4/2020 | Patrick | H04L 12/2801 |
| 2009/0103557 | A1 | 4/2009 | Hong et al. | |
| 2011/0261917 | A1 * | 10/2011 | Bedrosian | H04J 3/0697 375/371 |
| 2012/0300859 | A1 * | 11/2012 | Chapman | H04J 3/0664 375/257 |
| 2015/0295669 | A1 | 10/2015 | Chapman et al. | |
| 2019/0036785 | A1 * | 1/2019 | Pfeffer | H04L 47/783 |
| 2019/0140758 | A1 * | 5/2019 | Cotter | H04L 12/2801 |
| 2019/0386871 | A1 * | 12/2019 | Quan | H04L 12/12 |
| 2020/0195361 | A1 * | 6/2020 | Neugeboren | H04J 3/0644 |

(Continued)

OTHER PUBLICATIONS

DVB Organization: "CM-SP-R-DTI-106-171220.pdf", DVB, Digital Video Broadcasting, C/O Ebu—17A Ancienne Route—CH-1218 Grand Saconnex, Geneva—SWITZERLAND, Jan. 15, 2018, XP017854816, sections 5.1-5.4, sections 5.5.3.3.

(Continued)

*Primary Examiner* — Alpus Hsu
(74) *Attorney, Agent, or Firm* — Chernoff, Vilhauer, McClung & Stenzel, LLP

(57) ABSTRACT

Present disclosure describes the techniques for regaining synchronization between the RPD and the PTP server, without resetting RPD, in the event of run time-phase jump experienced at RPD. To do so, said technique discloses identifying a run time phase jump event at a remote Physical device (RPD) and initiating an Upstream Channel Descriptor (UCD) refresh procedure to reconnect the RPD with Precision Time Protocol (PTP) server.

3 Claims, 3 Drawing Sheets

(56) References Cited

U.S. PATENT DOCUMENTS

| | | | |
|---|---|---|---|
| 2020/0195362 A1 | 6/2020 | Neugeboren | |
| 2020/0343988 A1* | 10/2020 | Nandiraju | H04J 3/0661 |
| 2021/0152386 A1* | 5/2021 | Chari | H04L 45/586 |
| 2021/0160090 A1* | 5/2021 | Orban | H04L 12/2898 |
| 2021/0160091 A1* | 5/2021 | Foley | H04N 21/6168 |
| 2021/0360319 A1* | 11/2021 | Chari | H04N 21/4516 |
| 2021/0384974 A1* | 12/2021 | Goenka | H04N 21/6338 |
| 2021/0385550 A1* | 12/2021 | Jothilingam | H04N 21/6118 |

OTHER PUBLICATIONS

International Search Report and Written Opinion RE: Application No. PCT/US22/34737, dated Oct. 19, 2022.

* cited by examiner

RPD UCD REFRESH FOR TIMESTAMP RECOVERY

CROSS-REFERENCE TO RELATED APPLICATIONS

The present application claims priority to U.S. Provisional App. No. 63/214,090 filed Jun. 23, 2021, the contents of which are each incorporated herein by reference in their entirety.

TECHNICAL FIELD

The present disclosure relates to the field of communications, and more particularly, relates to the field of delivering cable television (CATV) content to sub scribers using distributed access architectures.

BACKGROUND

Historically, CATV content was assembled into video and data signals at a head end and delivered to customers using a tree-and-branch network of nodes, amplifiers, drop cables, etc. Many modern cable television (CATV) architectures, however, distribute some of the functionality traditionally occurring in the head end to the nodes. Such architectures are called Distributed Access Architectures (DAA). One such DAA architecture is a Remote-Physical (R-PHY) architecture where the physical layer tasks of receiving content from various sources and combining it into e.g., Quadrature-Amplitude Modulated (QAM) signals is assigned to the node, while higher layer functionality such as the MAC layer processing remains in the head end. Other DAA architectures (e.g., R-MACPHY) may also move this MAC-layer processing into a node. Such DAA architectures, and particularly R-PHY architectures, require precise synchronization between components in the head end, such as a CCAP and/or video core, and components in the remote node, and this synchronization must be in both frequency and phase. Often, however, such architectures lose synchronization, and when synchronization is regained, the RPD experiences a phase offset from the timing server, which is referred to in this specification as a run-time phase jump. The run time phase jump could happen due to various factors, which as just noted, includes a circumstance where the Remote Physical Device (RPD) loses connectivity to Precision Time Protocol (PTP) server for perhaps an extended period of time. When connection is regained, the clocks of the RPD and cable modems need to be resynchronized to the PTP timing server, and this resynchronization procedure requires a reset of the cable modems. Furthermore, the resynchronization procedure also resets the RPD, which is not desirable. This happens because the RPD does not have the current value of Orthogonal Frequency Divisional Multiple Access (OFDMA) Timestamp Snapshots required to program Data Over Cable Service Interface Specifications (DOCSIS) PHY layer.

Therefore, there is a need of the art to overcome the above problem(s) and avoid the resetting of RPDs.

SUMMARY

One or more shortcomings of the prior art are overcome, and additional advantages are provided by the present disclosure. Additional features and advantages are realized through the techniques of the present disclosure. Other embodiments and aspects of the disclosure are described in detail herein and are considered a part of the disclosure.

Pursuant to embodiments of the present disclosure, a method for regaining synchronization between a remote Physical device (RPD) and a Precision Time Protocol (PTP) server without resetting a remote Physical device (RPD), in the event of run time-phase jump experienced at RPD, is disclosed. To achieve this, the method discloses identifying a run time phase jump event at a remote Physical device (RPD) and initiating an Upstream Channel Descriptor (UCD) refresh procedure to synchronize the RPD with Precision Time Protocol (PTP) server.

In some embodiments, the identified run time phase jump event comprises the RPD experiencing frequency and phase drift from the PTP server, after which the RPD regains connectivity with the PTP server.

In some embodiments, the UCD refresh procedure comprises sending a request to a Converged Cable Access Platform (CCAP) core to re-acquire an OFDMA timestamp and in response receiving an OFDMA timestamp snapshot from CCAP core, wherein the CCAP core performs the UCD refresh procedure with a current configuration at the CCAP core for the OFDMA channel.

In some embodiments, the step of synchronizing the RPD to the PTP server comprises enabling DOCSIS PHY with UCD configuration along with the OFDMA timestamp snapshot, based on the received UCD message and processing UEPI MAPs for OFDMA channels.

In some embodiments, the UCD message comprises an incremented change count.

In some embodiments, synchronizing the RPD with the PTP server occurs without resetting the RPD upon completion of UCD refresh procedure, thereby enabling continued channel operation.

Pursuant to further embodiments of the present disclosure, a system is disclosed to regain synchronization between a remote Physical device (RPD) and the Precision Time Protocol (PTP) server in the event of run time-phase jump experienced at RPD, without resetting a remote Physical device (RPD. To achieve this, the system may comprise a Precision Time Protocol (PTP) server, a Converged Cable Access Platform (CCAP) core and a remote Physical device (RPD) operatively connected to the PTP server and the CCAP core, wherein the RPD is configured to identify a run time phase jump event and initiate an Upstream Channel Descriptor (UCD) refresh procedure to synchronize the RPD with the PTP server.

In some embodiments, the identified run time phase jump event comprises the RPD experiencing frequency and phase drift from the PTP server, after which the RPD regains connectivity with the PTP server.

In some embodiments, to initiate the UCD refresh procedure the RPD is configured to send a request to CCAP core to re-acquire an OFDMA timestamp and receive an OFDMA timestamp snapshot from CCAP core, wherein the CCAP core performs the UCD refresh procedure with current configuration at CCAP core for OFDMA channel.

In some embodiments, synchronizing the RPD with the PTP server comprises enabling DOCSIS PHY with UCD configuration along with the value of an OFDMA timestamp snapshot, based on the received UCD message and processing UEPI MAPs for OFDMA channels.

In some embodiments, the UCD message comprises an incremented change count.

In some embodiments, the RPD synchronizes with the PTP server without resetting upon completion of UCD refresh procedure, thereby enabling continued channel operation.

Pursuant to still further embodiments of the present disclosure, a non-transitory tangible computer-readable medium having instructions thereon may include instructions comprising code for identifying a run time phase jump event at a remote Physical device (RPD) and code initiating an Upstream Channel Descriptor (UCD) refresh procedure, to synchronize the RPD with Precision Time Protocol (PTP) server.

In some embodiments, code for the run time phase jump event comprises the RPD experiencing frequency and phase drift from the PTP server, after which the RPD regains connectivity with the PTP server.

In some embodiments, the code for UCD refresh procedure comprises sending a request to a Converged Cable Access Platform (CCAP) core to re-acquire an OFDMA timestamp and receiving an OFDMA timestamp snapshot from the CCAP core, wherein the CCAP core performs the UCD change procedure with a current configuration at the CCAP core for OFDMA channel.

In some embodiments, the code for synchronizing the RPD with the PTP server comprises enabling DOCSIS PHY with UCD configuration along with the value of OFDMA timestamp snapshot, based on received UCD message and processing UEPI MAPs for OFDMA channels.

In some embodiments, the UCD message comprises incremented change count.

In some embodiments, synchronizing the RPD with the PTP server without resetting the RPD, upon completion of UCD refresh procedure, thereby enabling continued channel operation.

In the above paragraphs, the most important features of the disclosure have been outlined, in order that the detailed description thereof that follows may be better understood and in order that the present contribution to the art may be better understood and in order that the present contribution to the art may be better appreciated. There are, of course, additional features of the disclosure that will be described hereinafter and which will form the subject of the claims appended hereto. Those skilled in the art will appreciate that the conception upon which this disclosure is based may readily be utilized as a basis for the designing of other structures for carrying out the several purposes of the disclosure. It is important therefore that the claims be regarded as including such equivalent constructions as do not depart from the spirit and scope of the disclosure.

OBJECTIVE

The object of the present disclosure is to provide a method that identifies a run time phase jump at the RPD, and in response to such detection initiates the UCD refresh procedure at the RPD.

Another object of the present disclosure is to provide a method that avoids resetting of the RPD when the RPD has regained connectivity with the PTP server, after experiencing a run-time phase jump.

Yet another object of the present disclosure is to provide a method in which, even when the cable modems become temporarily impaired on an OFDMA channel when a run time PTP phase jump occurs at the RPD, the UCD Refresh procedure allows the OFDMA channel to come back into service as soon as the UCD refresh operation is completed for the OFDMA channel.

BRIEF DESCRIPTION OF THE ACCOMPANYING DRAWINGS

Further aspects and advantages of the present disclosure will be readily understood from the following detailed description with reference to the accompanying drawings, where like reference numerals refer to identical or functionally similar elements throughout the separate views. The figures together with the detailed description below, are incorporated in and form part of the specification, and serve to further illustrate the aspects and explain various principles and advantages, in accordance with the present disclosure wherein.

DETAILED DESCRIPTION

Figure 1A:
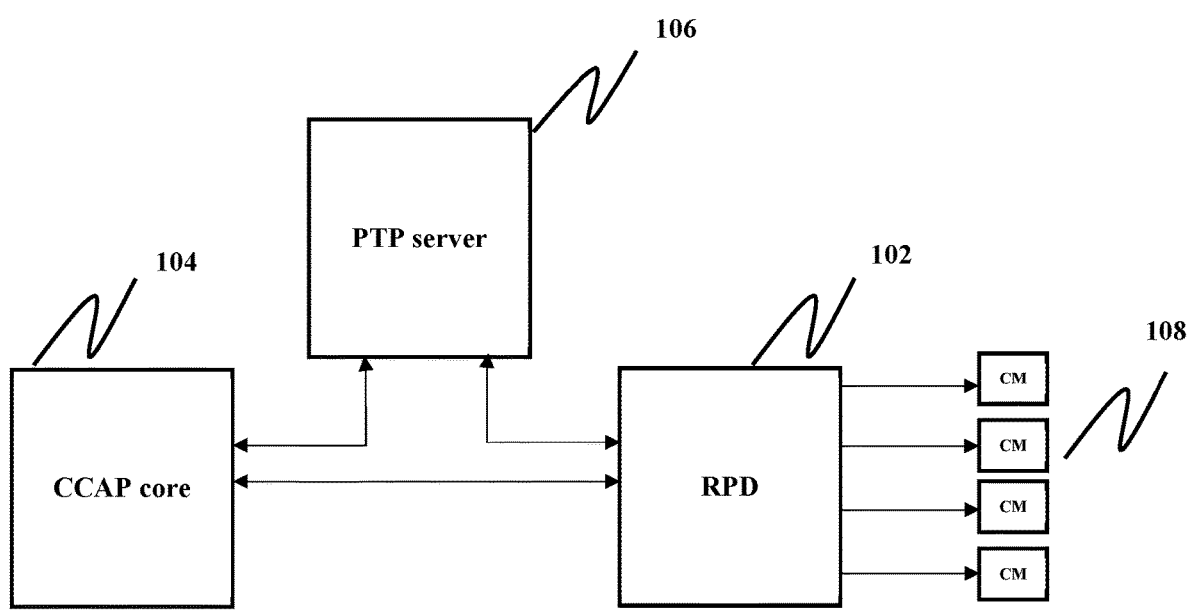
FIG. 1A illustrates an exemplary Remote PHY architecture 100 for CATV including at least a Remote Physical Device (RPD) connected to a CCAP core, a Precision Time Protocol (PTP) server and a plurality of cable modems, via different mediums, in accordance with an embodiment of the present disclosure.

Referring in the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device that comprises a list of components does not include only those components but may include other components not expressly listed or inherent to such setup or device. In other words, one or more elements in a system or apparatus proceeded by "comprises . . . a" does not, without more constraints, preclude the existence of other elements or additional elements in the system or apparatus or device.

Disclosed herein is a technique for regaining synchronization between a remote Physical device (RPD) and a Precision Time Protocol (PTP) server in the event of a run time-phase jump experienced at the RPD, without resetting the RPD. To do so, the technique preferably identifies a run time phase jump event at an RPD and initiates an Upstream Channel Descriptor (UCD) refresh procedure to synchronize the RPD with the PTP server.

As shown in FIG. 1A, existing Cable Television (CATV) architectures deployed in a Remote Physical (RPHY) environment (100) broadly includes a Remote Physical device (RPD) (102) connected to a Converged Cable Access Platform (CCAP) core (104) via one or more wired or wireless networks, such as ethernet. Those skilled in the art will appreciate that, although not expressly shown, the CCAP core (104) may include a Cable Modem Termination System (CMTS) Core for Data Over Cable Service Interface Specifications (DOCSIS) and an Edge Quadrature Amplitude Modulation (EQAM) Core for Video. Further, the CMTS Core may contain a DOCSIS MAC layer and upper layer DOC SIS protocols which includes all signaling functions, downstream and upstream bandwidth scheduling, and DOC SIS framing required for the functioning of the CATV architecture deployed in Remote Physical (RPHY) environment (100).

Those skilled in the art will also appreciate that the RPD (102) may include, among other essential components, a DOC SIS PHY layer, a downstream Quadrature Amplitude Modulation (QAM) modulator (not shown), upstream QAM, demodulators (not shown), together with pseudowire logic (not shown) that is configured to connect the CCAP Core (104) to the RPD (102). It may be noted that the RPD (102) and the CCAP core (104) include other essential components/elements required to carry out the desired functionalities and the same have not been explained here for the sake of brevity. In an exemplary embodiment, FIG. 1A shows a single RPD (102) connected to a single CCAP core (104). However, various other embodiments may be possible where more than one RPD (102) may be connected to a single CCAP core (104).

FIG. 1A further shows a PTP server (106) connected to both the RPD (102) and the CCAP core (104) to synchronize one or more slave clocks (not shown) present inside each of the RPD (102) and the CCAP core (104) to a master clock (not shown) of the PTP server (106), and also synchronize the slave clocks of the RPD (102) and the CCAP core (104) to each other. Further, FIG. 1A shows the RPD (102) connected to a plurality of Cable Modems (CMs) (108), e.g., using wired and/or wireless technology.

As shown in FIG. 1A, the CCAP core (104) and the RPD (102) remain connected to each other. Further, the RPD (102) and the CCAP core (104) also preferably remain connected to the PTP server (106), which allows the CCAP core (104) and the RPD (102) to remain in synchronization with each other so that data packets from CCAP core (104) may be seamlessly transmitted to the RPD (102).

However, in some circumstances, either of the CCAP core (104) or the RPD (102) may lose connectivity with the PTP server (106), which may interfere with the seamless transmission of data packets from the CCAP core (104) to the RPD (102), which may further disturb the transmission of the data packets to CM (108) placed at a subscriber's end. Further, if either of the RPD (102) or the CCAP core (104) loses connectivity with the PTP server (106), the device that is not connected will drift in frequency and phase from the PTP server (106) and from the other device as well. The magnitude of such drift may depend on many factors such as the length of period for which the device remains disconnected to the PTP server (106), temperature variations, internal oscillator performance etc.

The present disclosure is particularly directed to problems encountered when the RPD (102) loses connectivity with the PTP server (106) for a period of time sufficient to require a phase jump in the clock of the RPD when the timing connection is restored. As noted earlier, if the RPD (102) loses connection to the PTP server (106) (a period referred to as "holdover") then its clock will begin to drift in both frequency and phase relative to that of both the PTP server (106) and the CCAP core (104), and if that drift continues for a sufficient period of time it will result in enough of a discrepancy between the phase value of the RPD clock and that of the core clock, which will require a step-wise correction when synchronization is restored. For purposes of this specification, the occurrence of a period of holdover for a period of time sufficient to cause a stepwise-correction in the phase value of the clock of the RPD (102) relative to the PTP server (106) is referred to in this specification as a "run time phase jump" event.

In conventional techniques, whenever the connectivity between the RPD (102) and the PTP server (106) is lost for certain period of time (i.e. that results in phase jump), it requires manual intervention to detect such phase jump. In particular, in conventional techniques, whenever connectivity between the RPD (102) and the PTP server (106) is lost for certain period of time (i.e. a phase jump has occurred), a technician/operator is required to detect such phase jump and reset the RPD (102). Precisely, since the technician/operator cannot compensate for the drift (in both frequency and phase) occurred at the RPD (102) with respect to that of the PTP server (106) due to said disconnection, the technician/operator needs to reset RPD (102), which is not desirable. Moreover, in other words, the resetting of the RPD (102) is mainly required because the RPD (102) does not have the current value of the "OFDMA Timestamp Snapshot," which it must have in order to avoid the resetting of the RPD (102) and to regain the connectivity between the PTP server (106) and the RPD (102) from where it was lost.

Figure 1B:
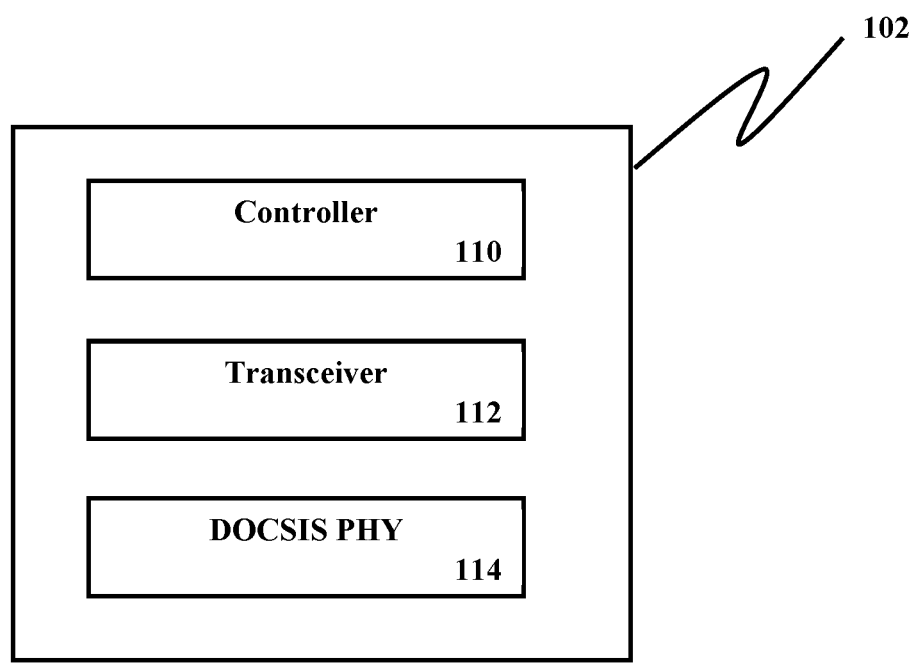
FIG. 1B illustrates a block diagram 200 illustrating an exemplary architecture of the RPD, by way of block diagram, in accordance with the embodiments of the present disclosure.

To solve the foregoing problem, the present specification discloses that, when the RPD (102) has reacquired connectivity with the PTP server (106), the RPD (102) is configured to identify the event of the run-time phase jump. The runtime phase jump event is an event following an interval in which the slave clock at the RPD (102) experiences discrepancy in both the frequency and phase from the master clock at the PTP server (106), such that upon regaining connectivity with PTP server (106) a step-wise phase adjustment is to be implemented at the RPD to regain synchronization. Once, this event is identified, the RPD (102) initiates its own process of UCD refresh to regain OFDMA timestamp snapshot from the CCAP core (104). In some embodiments, the RPD (102) preferably includes a controller (110) (as shown in FIG. 1B) that identifies the frequency and phase offset at the RPD (102) at the time of resynchronization. In particular, in such embodiments, the controller (110) is configured to identify whether the phase offset between the slave clock at the RPD (102) and the grand master clock at the PTP server (106) is of a magnitude such that adjusting the same by a step-wise phase correction is preferable to correcting the phase offset via small frequency adjustments over a lone interval. Upon determining that a run-time phase jump at the RPD (102) is preferable, in this embodiment the controller (110) in combination with a transceiver (112) is configured to send the UCD refresh request to the CCAP core (104) for all the configured and enabled OFDMA channels.

Those skilled in the art will appreciate that to initiate the UCD refresh request, the RPD (102) is configured to send the UCD Refresh Generic Control Plane (GCP) notification along with various GCP Type-Length-Value or Tag-Length-Value (TLVs) notifications to the CCAP core (104). In an exemplary embodiment, the RPD (102) may be configured to send GCP Notification including, at least one of following GCP TLVs:
(i). NotificationType (TLV 86.1) set to "ChannelUcdRefreshRequest(9)"

(ii). RfChannelSelector (12) TLV identifying the channel for which UCD refresh is being requested.
(iii). UcdRefreshStatusOfdma (TLV 79.10)
(iv). UcdRefreshRequestOfdma (TLV 79.10.1) with a value of 1
(v). UcdRefreshReasonOfdma (TLV 79.10.2) containing ASCII string for the reason for UCD refresh.

The GCP TLVs notifications discussed above disclose an exemplary embodiment and shall not be construed limiting in any sense. In particular, UCD refresh GCP Notify, sent from RPD (102) to the CCAP core (104) may include other notifications that are required to carry out the desired function. In accordance with FIG. 1A, once the CCAP core (104) receives the UCD Refresh GCP Notification from the RPD (102), the CCAP core (104) based on the UCD Refresh GCP Notification performs the UCD refresh change procedure with current configuration at the CCAP core (104) for all the OFDMA channels, and sends the UCD message (with incremented change count) for all the OFDMA channels to the RPD (102).

Once the RPD (102) receives the UCD message (with incremented change count) for all the OFDMA channels, the controller (110) at the RPD (102) programs the Data Over Cable Service Interface Specifications (DOC SIS) PHY (114) with UCD configuration along with latest value of OFDMA timestamp snapshot received from the CCAP core (104). Since, now the RPD (102) has the current value of the OFDMA time stamp, it is able to synchronize with the PTP server (106) without requiring the RPD (102) to reset. This allows DOCSIS PHY (114) to start processing the Upstream External PHY Interface (UEPI) MAPs for all the OFDMA channels as per latest OFDMA timestamp snapshot to synchronize the RPD (102) with the PTP server (106) without requiring resetting of the RPD (102).

Figure 2:
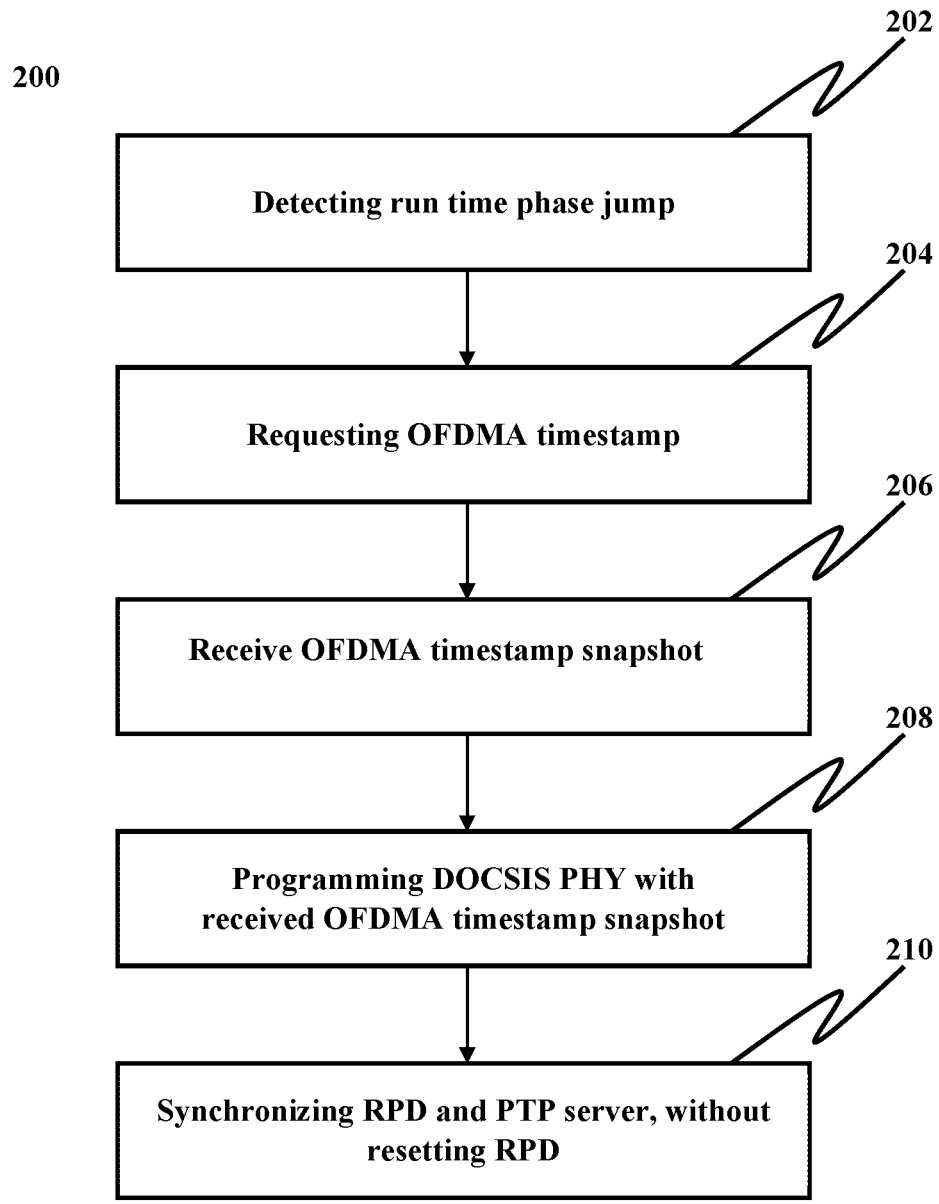
FIG. 2 illustrates a flow chart of method for initiating UCD refresh procedure at the RPD, in accordance with an embodiment of the present disclosure.

FIG. 2 shows an exemplary method 200 for initiating the UCD refresh procedure at the RPD (102) when the RPD (102) regains connectivity with the PTP server (106) after a period of time during which the RPD (102) experienced both frequency and phase drift compared to the PTP server (106), and for which the drift is corrected via a run time phase jump.

The method starts at step 202 by detecting an event of run time phase jump at the RPD (102). At step 204, the RPD (102) sends a request to the CCAP core (104) to acquire OFDMA timestamp for all the configured and enabled OFDMA channels. The request sent for OFDMA timestamp from the RPD (102) to the CCAP core (104) comprises sending GCP notification including, at least one of following GCP TLVs:
(i). Notification Type (TLV 86.1) configured set to "Channel UCD Refresh Request"
(ii). RF Channel Selector (12) TLV configured for identifying the channel for which UCD refresh is requested.
(iii). UCD Refresh Status OFDMA (TLV 79.10)
(iv). UCD Refresh Request OFDMA (TLV 79.10.1) with a value of 1
(v). UCD Refresh Reason OFDMA (TLV 79.10.2) containing ASCII string for the reason for UCD refresh.

In response to sending the request, at step 206, the RPD (102) receives the OFDMA timestamp snapshot from the CCAP core (104). As subsequent step 208, the RPD (102) programs the DOCSIS PHY (114) with the UCD configuration along with the value of OFDMA timestamp snapshot received from the CCAP core (104). At step 210, the RPD (102) synchronizes with the PTP server (106), without resetting. In other words, the RPD (102) synchronizes its slave clock with the master clock of the PTP server (106) to mitigate the frequency and phase drift occurred due to the event of run time phase difference.

The flowchart and block diagrams in the Figures illustrate the architecture, functionality, and operation of possible implementations of devices, methods, and computer program products according to various embodiments of the present disclosure. In this regard, each block in the flowchart or block diagrams may represent a module, unit, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In a non-limiting embodiment of the present disclosure, one or more non-transitory computer-readable media may be utilized for implementing the embodiments consistent with the present disclosure. A computer-readable media refers to any type of physical memory on which information or data readable by a processor may be stored. Thus, a computer-readable media may store one or more instructions for execution by the at least one processor/controller 110, including instructions for causing the at least one processor/controller 110 to perform steps or stages consistent with the embodiments described herein. The term "computer-readable media" should be understood to include tangible items and exclude carrier waves and transient signals. By way of example, and not limitation, such computer-readable media can comprise Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Thus, certain aspects may comprise a computer program product for performing the operations presented herein. For example, such a computer program product may comprise a computer readable media having instructions stored (and/or encoded) thereon, the instructions being executable by one or more processors/controllers to perform the operations described herein. For certain aspects, the computer program product may include packaging material.

The various illustrative logical blocks, modules, and operations described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may include a microprocessor, but in the alternative, the processor may include any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

As used herein, a phrase referring to "at least one" or "one or more" of a list of items refers to any combination of those items, including single members. As an example, "at least one of: a, b, or c" is intended to cover: a, b, c, a-b, a-c, b-c, and a-b-c. The terms "a", "an" and "the" mean "one or more", unless expressly specified otherwise.

The terms "an embodiment", "embodiment", "embodiments", "the embodiment", "the embodiments", "one or more embodiments", "some embodiments", and "one embodiment", "other embodiment", "yet another embodiment", "non-limiting embodiment" mean "one or more (but not all) embodiments of the disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

A description of an embodiment with several components in communication with each other does not imply that all such components are required. On the contrary, a variety of optional components are described to illustrate the wide variety of possible embodiments of the disclosure.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the appended claims.

| Referral Numerals: | |
|---|---|
| Reference Number | Description |
| 100 | CATV ARCHICTURE DEPLOYED USING REMOTEPHYSICAL(RPHY) ENVIRONMENT |
| 102 | REMOTE PHYSICAL DEVICE (RPD) |
| 104 | CONVERGEDCABLEACCESS PLATFORM (CCAP) CORE |
| 106 | PRECISION TIME PROTOCOL (PTP) SERVER |
| 108 | CABLE MODEM(S) (CM) |
| 110 | PROCES SOR/CONTROLLER |
| 112 | TRANSCEIVER |
| 114 | DOCSIS PHY |

| Referral Numerals: | |
|---|---|
| Reference Number | Description |
| 200 | METHOD FLOW-CHART |
| 202-210 | METHOD STEPS |

I claim:

1. A method comprising:
   identifying a run time phase jump event at a Remote Physical Device (RPD); and
   initiating, an Upstream Channel Descriptor (UCD) refresh procedure, to synchronize the RPD with Precision Time Protocol (PTP) server without resetting the RPD;
   wherein the UCD refresh procedure comprises:
   sending a request to Converged Cable Access Platform (CCAP) core to re-acquire Orthogonal Frequency Divisional Multiple Access (OFDMA) timestamp; and
   receiving OFDMA timestamp snapshot from CCAP core, wherein the CCAP core performs the UCD refresh procedure with current configuration at CCAP core for OFDMA channel.

2. A system comprising:
   a Precision Time Protocol (PTP) server;
   a Converged Cable Access Platform (CCAP) core; and
   a remote Physical device (RPD) operatively connected to the PTP server and the CCAP core, wherein the RPD is configured to:
   identify a run time phase jump event; and
   initiate, an Upstream Channel Descriptor (UCD) refresh procedure, to synchronize the RPD with the PTP server without resetting the RPD;
   wherein to initiate the UCD refresh procedure the RPD is configured to:
   send a request to CCAP core to re-acquire Orthogonal Frequency Divisional Multiple Access (OFDMA) timestamp;
   receive OFDMA timestamp snapshot, from CCAP core, wherein the CCAP core performs the UCD refresh procedure with current configuration at CCAP core for OFDMA channel.

3. A computer program product comprising a non-transitory tangible computer-readable medium having instructions thereon, the instructions comprising:
   code for identifying a run time phase jump event at a remote Physical device (RPD); and
   code initiating, an Upstream Channel Descriptor (UCD) refresh procedure, to synchronize the RPD with Precision Time Protocol (PTP) server without resetting the RPD;
   wherein the code for UCD refresh procedure comprises:
   sending a request to Converged Cable Access Platform (CCAP) core to re-acquire Orthogonal Frequency Divisional Multiple Access (OFDMA) timestamp;
   receiving OFDMA timestamp snapshot, from the CCAP core, wherein the CCAP core performs the UCD change procedure with current configuration at the CCAP core for OFDMA channel.

* * * * *